(12) United States Patent
Deigner et al.

(10) Patent No.: US 8,919,753 B2
(45) Date of Patent: Dec. 30, 2014

(54) SPRING PLATE

(75) Inventors: Bruno Deigner, Niederwerrn (DE);
Günther Handke, Euerbach (DE);
Frank Hassmann, Schweinfurt (DE);
Jörg Hermes, Bonn (DE); Joachim Koberstein, Gräfendorf (DE);
Alexander Miller, Litzendorf (DE);
Jörg Pagel, Hoppachshof (DE); Josef Renn, Dettelbach-Bahnhof (DE);
Manfred Schuler, Dittelbrunn (DE);
Klaus Stretz, Haßfurt (DE); Andreas Zietsch, Üchtelhausen-Zell (DE);
Gottfried Zimmermann, Sulzthal (DE)

(73) Assignee: ZH Friedrichshafen AG, Friedrichshafen (DE)

( * ) Notice: Subject to any disclaimer, the term of this patent is extended or adjusted under 35 U.S.C. 154(b) by 1248 days.

(21) Appl. No.: 11/225,278

(22) Filed: Sep. 13, 2005

(65) Prior Publication Data
US 2006/0061025 A1    Mar. 23, 2006

(30) Foreign Application Priority Data
Sep. 16, 2004    (DE) .......................... 10 2004 044 752

(51) Int. Cl.
F16F 1/06    (2006.01)
B60G 15/06    (2006.01)
F16F 9/32    (2006.01)

(52) U.S. Cl.
CPC ............ B60G 15/063 (2013.01); F16F 9/3207 (2013.01); B60G 2202/312 (2013.01); B60G 2204/1242 (2013.01); B60G 2204/12422 (2013.01); B60G 2204/44 (2013.01)

USPC .......................... 267/179; 267/170; 267/221

(58) Field of Classification Search
USPC .......................................... 267/221, 170, 179
See application file for complete search history.

(56) References Cited

U.S. PATENT DOCUMENTS

| | | | |
|---|---|---|---|
| 3,051,469 A * | 8/1962 | Boschi ............................ | 267/33 |
| 4,362,294 A | 12/1982 | Schobbe et al. | |
| 4,655,439 A * | 4/1987 | Handke et al. ................ | 267/221 |
| 5,249,781 A * | 10/1993 | Wohler ............................ | 267/33 |

(Continued)

FOREIGN PATENT DOCUMENTS

| | | |
|---|---|---|
| DE | 29 38 101 | 12/1980 |
| DE | 42 03 658 | 7/1995 |

(Continued)

OTHER PUBLICATIONS

Merriam-Webster online dictionary [online], [retrieved on Mar. 18, 2008]. Retrieved from the Internet:<URL:http://www.merriam-webster.com/dictionary/discrete>.*

(Continued)

Primary Examiner — Thomas Irvin
Assistant Examiner — Mahbubur Rashid
(74) Attorney, Agent, or Firm — Cozen O'Connor

(57) ABSTRACT

A spring plate, especially for a MacPherson strut unit, having an axial support surface for the final turn of a helical spring. The helical spring is centered by radial centering surfaces in the area of the circumferential contour of the final turn. The centering surface is divided into individual, partial centering surfaces, which come to rest against the circumferential contour of the helical spring.

10 Claims, 4 Drawing Sheets

(56) References Cited

U.S. PATENT DOCUMENTS

| | | | |
|---|---|---|---|
| 5,421,565 A * | 6/1995 | Harkrader et al. | 267/220 |
| 5,620,171 A | 4/1997 | Wakatsuki | |
| 6,123,350 A | 9/2000 | Suzuki | |
| 6,155,544 A * | 12/2000 | Solomond et al. | 267/220 |
| 6,612,553 B1 | 9/2003 | Aubarede et al. | |
| 6,726,191 B2 | 4/2004 | Miyagawa et al. | |

FOREIGN PATENT DOCUMENTS

| | | |
|---|---|---|
| EP | 1 431 082 | 6/2004 |
| EP | 1 443 238 | 8/2004 |
| EP | 1 505 313 | 2/2005 |
| FR | 2 825 126 | 11/2002 |
| JP | 57 06 91 34 | 4/1982 |
| JP | 63 176838 | 7/1988 |
| JP | 09 196101 | 7/1997 |
| JP | 2003 222176 | 8/2003 |

OTHER PUBLICATIONS

Search Report dated Feb. 8, 2006 issued for corresponding European Application No. EP 05 01 9611.

Office Action dated Feb. 16, 2005 issued for corresponding German Application No. 10 2004 044 752.7.

\* cited by examiner

SPRING PLATE

BACKGROUND OF THE INVENTION

1. Field of the Invention

The invention pertains to a spring plate for a strut unit.

2. Description of the Related Art

DE 42 03 658 C2 describes a spring plate especially for a MacPherson strut unit. This spring plate has a profile which accommodates the final turn of a helical spring and thus centers the spring radially and prevents it from rotating. The spring plate has an out-of-round circumferential area, against which the helical spring is radially supported. As can be seen in FIG. 4 of DE 42 03 658 C2, almost the entire inside diameter of the final turn of the helical spring rests against the spring plate.

This 3-dimensional design of a spring plate is highly favorable in theory, because the force of the helical spring is supported over a large area. In addition, because of the out-of-round profile of the contact surface for the spring, an anti-rotation function can also be provided. The problem, however, is that the dimensions of the final turn of a spring cannot be kept within the necessary tolerances without increasing manufacturing costs to an unacceptable level, which means that the combination of a helical spring with the spring plate described in the state of the art is very difficult to realize.

When the helical spring does not rest optimally on the spring plate, strong stresses develop in the spring plate. Under certain conditions, these elevated stresses might be absorbed by the use of materials with appropriate load-bearing capacities. Another major problem is the noise which is produced when the helical spring changes its length as a result of its elastic movement. The noise problem can be solved in many cases by the use of a shim of plastic between the helical spring and the spring plate. This solution, however, does not eliminate the cause of the noise, only the effects. In older vehicles, the shim can also wear out, so that the noise then becomes clearly audible again.

SUMMARY OF THE INVENTION

The object of the present invention is to provide a spring plate for a helical spring which minimizes the amount of noise produced.

This object is met to by the present invention having the centering surface which is divided into individual, partial centering surfaces resting against the circumferential contour of the helical spring.

The overall centering surface, which is divided into partial centering surfaces, leads to a clear reduction in the noise produced, because the open spaces between the partial surfaces can accommodate any deviations from the ideal shape of the final turn of the spring.

In another advantageous embodiment of the invention, at least one partial centering surface acts on the inner contour, and at least one other partial surface acts on the outer contour, where the partial centering surfaces for the outer and inner contours of the helical spring are offset from each other in the circumferential direction. A partial centering surface on the inner contour faces a gap on the outer contour of the helical spring, so that the spring can never be clamped between two opposing partial centering surfaces.

To obtain the smallest possible overall centering surface and to ensure the uniform distribution of the partial centering surfaces, the centering surface acting on the outer contour of the helical spring is located approximately in the area of half the angle, measured at the circumference, between the first and the last centering surfaces acting on the inner contour of the helical spring.

In this case, only one partial centering surface comes to rest against the outer contour of the helical spring over a limited angle at the circumference.

In another advantageous embodiment, a run-out area of the partial centering surface facing the helical spring has a smaller outside radius than the inner contour of the helical spring. Any deviations in the diameter of the helical spring thus cannot cause the spring to be jammed in place by a partial centering surface.

To minimize the accumulation of moisture and dirt on the spring plate, a run-off groove is formed between two partial centering surfaces acting on the inner contour of the helical spring.

To increase the strength of the spring plate, the partial centering surfaces terminate radially on the inside in the direction of the run-off groove.

The partial centering surfaces are arranged on the spring plate parallel to a uniformly round contact line of the helical spring, so that a simple, round final turn can be used, which is easier to produce than an out-of-round final turn.

In another embodiment, the connecting contour between two partial centering surfaces facing the inner contour of the helical spring is designed as an uncurved, slanted surface. This design of a spring plate is dimensionally very stable.

To minimize the degree to which the spring plate must be shaped, an anti-rotation stop for the helical spring is formed by an upright tongue bent upward from the spring plate.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
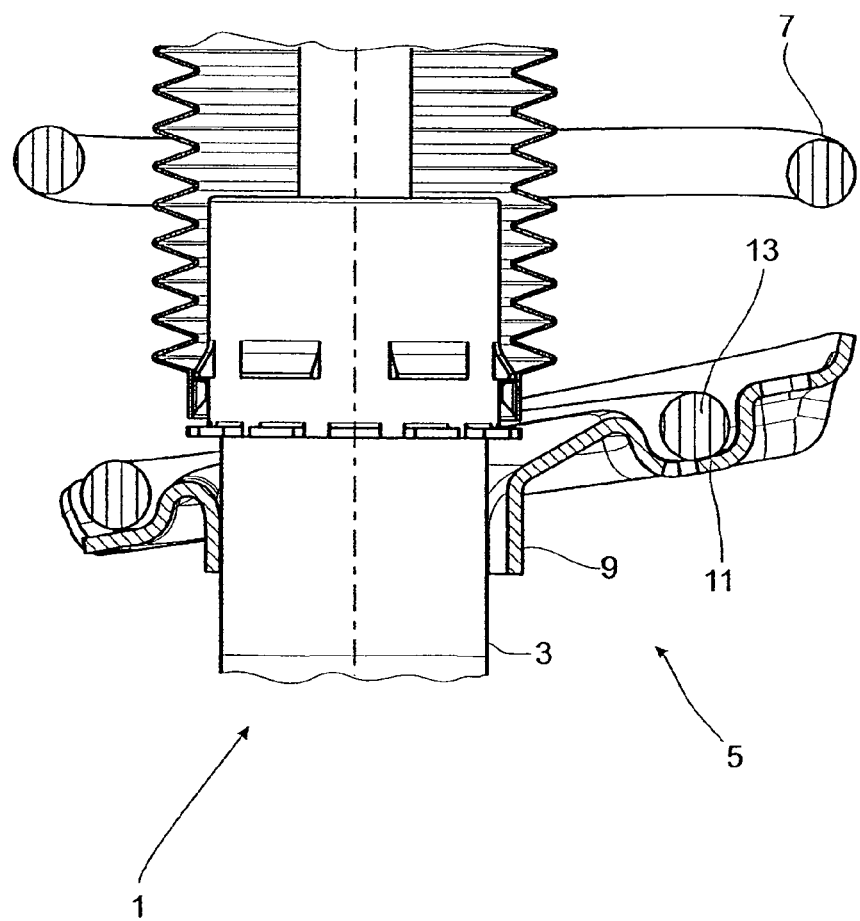
FIG. 1 shows an overall view of a spring plate on a MacPherson strut unit.

FIG. 1 shows a very highly simplified diagram of part of a MacPherson strut unit 1, to the cylinder 3 of which a spring plate 5 is attached. This plate supports a helical spring 7.

Figure 2:
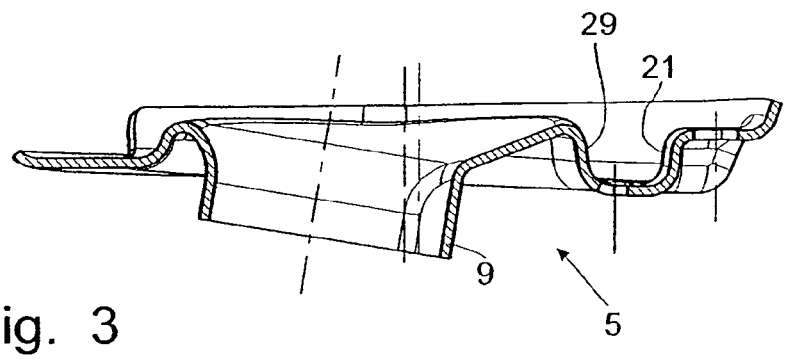
FIG. 2 shows a cross-sectional view of the spring plate of FIG. 1 taken along lines A-A of FIG. 3.
Figure 3:
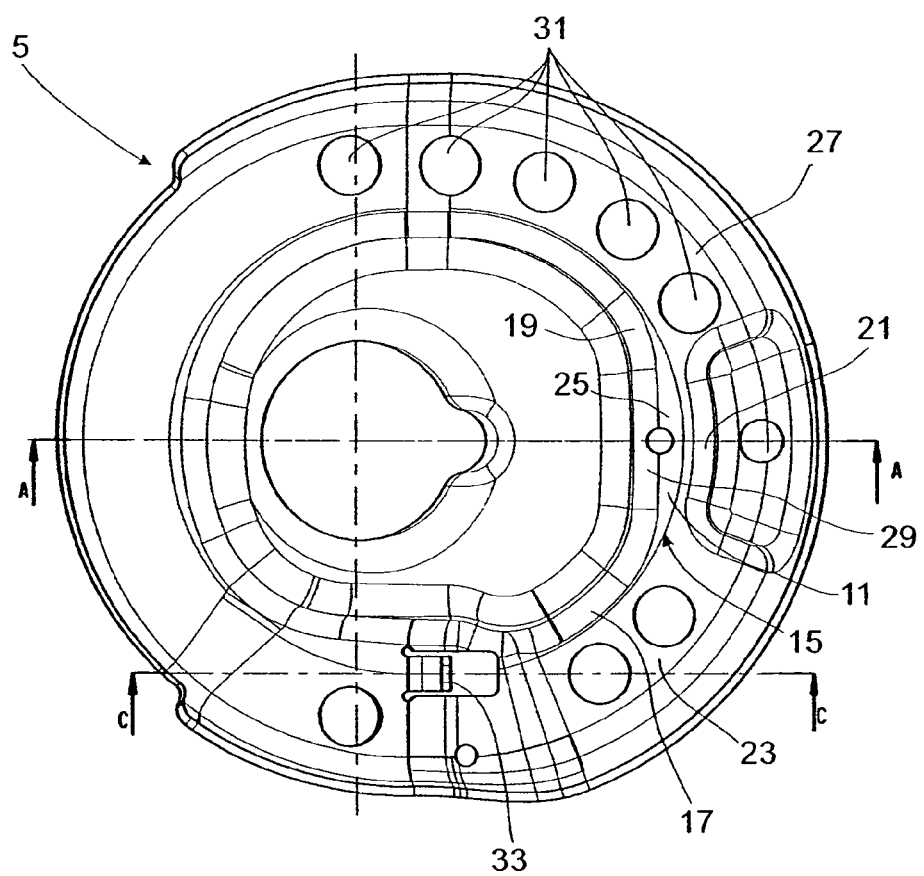
FIG. 3 shows a cross-sectional view of the spring plate of FIG. 1.
Figure 4:
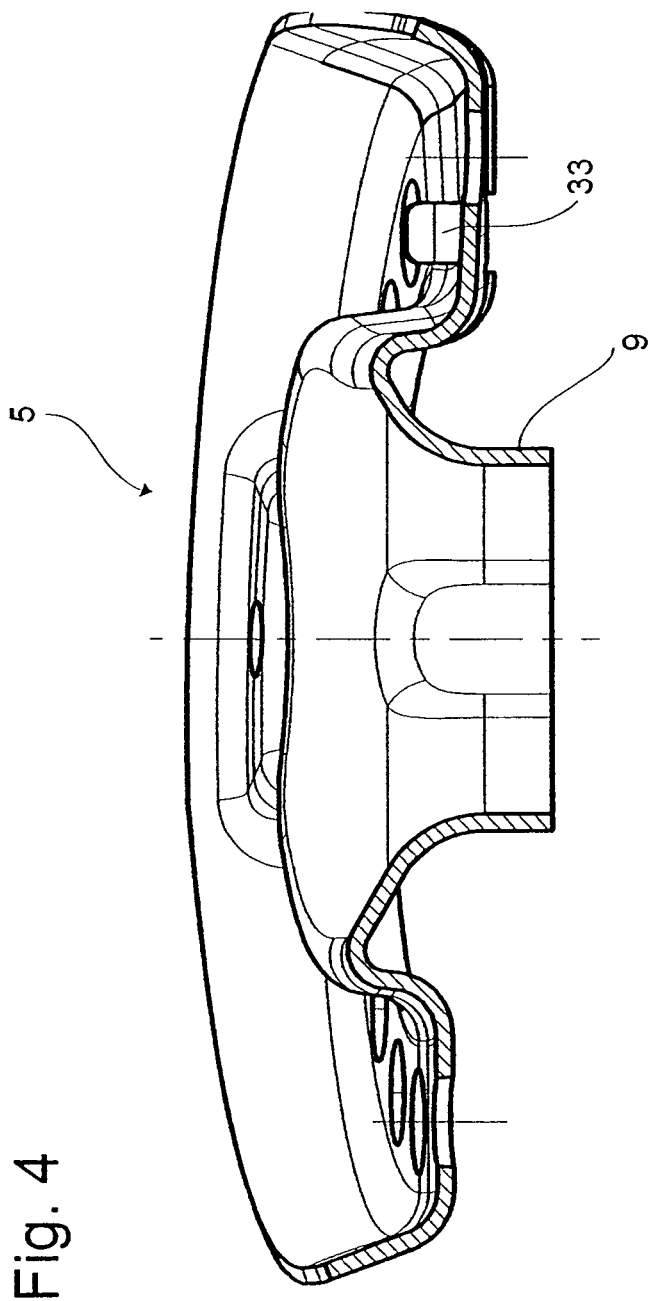
FIG. 4 shows another cross-sectional view of the spring plate of FIG. 1 taken along lines C-C of FIG. 2.

FIGS. 2-4 show the spring plate 5 of FIG. 1 as a separate part, which has a sleeve section 9 for attachment to the cylinder. This sleeve section 9 merges into a slanted support surface 11, on which the final turn 13 of the helical spring 7 rests. In the view of FIG. 2, the contact line 15 (shown in FIG. 3) of the final turn 13 on the support surface 11 is represented as a thin, solid line. A centering surface, which is divided into individual partial centering surfaces 17, 19 and which comes to rest against a circumferential contour—in the present case, the inner contour—of the helical spring, extends out from the plane of the support surface on the radially inward side of the contact line of the final turn. An outer contour of the helical spring is also supported by a centering surface 21, which extends around a limited circumferential angle, where the partial centering surfaces 17, 19, 21 are arranged parallel to the uniformly round contact line 15 of the helical spring. The partial centering surfaces 17, 19, 21 acting on the inner and outer contours are offset from each other in the circumferential direction, so that free spaces 23, 25, 27 are present between the partial centering surfaces 17, 19, 21. These spaces compensate, if necessary, for any deviations of the final turn from the desired shape or deviations in its position relative to the partial centering surfaces. Because the centering surfaces are produced by stamping, they can be made with much greater precision. The centering surface 21 acting on the outer contour of the helical spring is located approximately in the range of half the angle, measured at the circumference, between the first and the last centering surface 17, 19 acting on the inner contour. As a result, there are in all only three partial centering surfaces 17, 19, 21 to take over the job of radially supporting the final turn of the helical spring.

In this exemplary embodiment, a connecting contour 29 in the form of an uncurved, slanted surface is formed between the centering surfaces 17, 19 facing the inner contour of the helical spring. This design feature has a very positive effect on the strength of the overall spring plate 5 and makes it possible to provide an edge area with openings 31 to reduce weight, this area being radially outside the support surface 11.

A tongue 33 of the spring plate 5, which is stamped out from the axial support surface 11 and bent upward, serves as an anti-rotation device for the final turn 13 of the helical spring 7.

Figure 5:
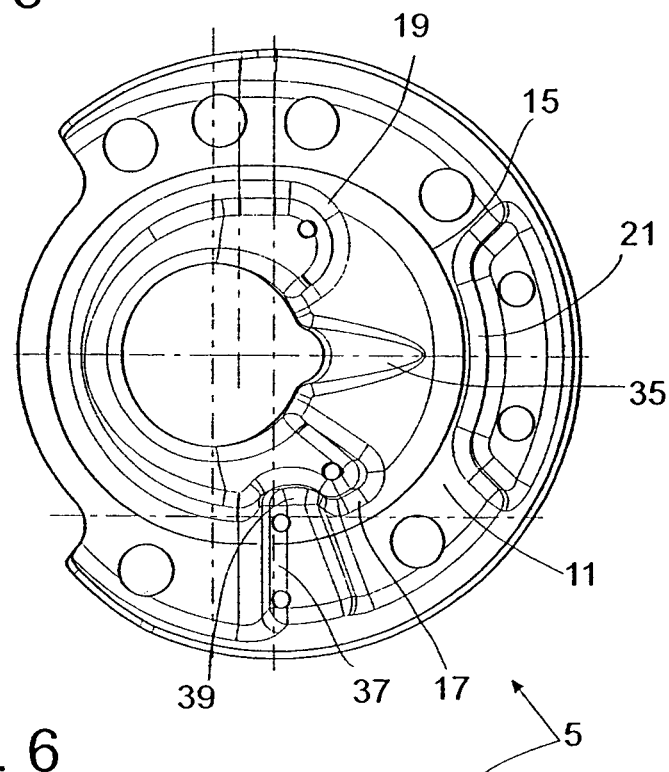
FIGS. 5 and 6 each show a spring plate with a run-off groove.
Figure 6:
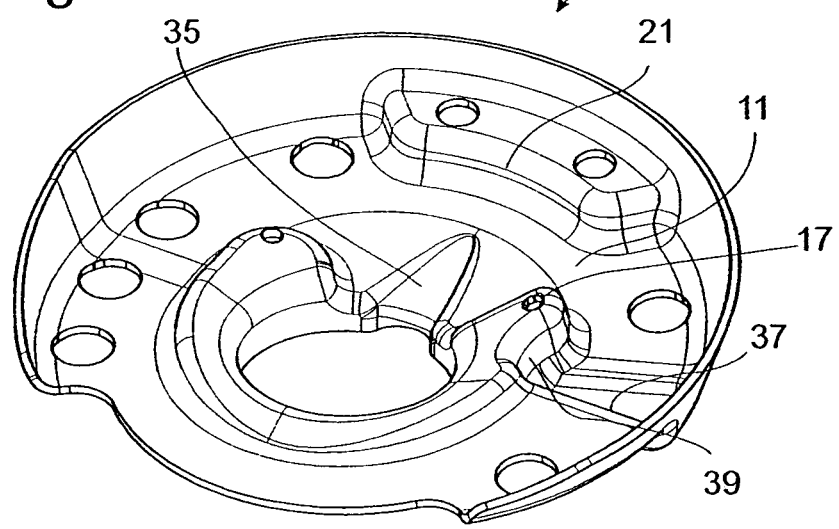

FIGS. 5 and 6 show a spring plate 5 with partial centering surfaces 17, 19 for the inner contour of the final turn, where a run-off groove 35 for dirt and moisture is provided between the partial centering surfaces 17, 19. The partial centering surfaces 17, 19 terminate radially on the inside in the direction toward the run-off groove 35, which widens as it proceeds toward the sleeve section 9. In the area of an end stop 37 for the final turn, the partial centering surface 17 has a run-out area 39 facing the helical spring, which has a smaller outside radius than the inner contour of the helical spring, so that an undercut is formed, which offers room for the run-out of the final turn.

Overall, the spring plate 5 according to the invention makes available a lightweight component, which, as tests have shown, prevents noise from being produced by frictional contact between the partial centering surfaces 17, 19, 21 and the helical spring 7 even without the use of spring pad.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A spring plate for supporting a helical spring having a final turn with a radially inner contour and a radially outer contour, the spring plate comprising:
    an axial support surface which contacts the final turn of the helical spring; and
    a plurality of discrete centering surfaces for centering the final turn on the axial support surface, the centering surfaces comprising at least one centering surface positioned to contact said inner contour and at least one curved centering surface positioned to contact said outer contour, wherein the centering surfaces are circumferentially offset from each other and are positioned to contact the final turn of the helical spring along respective separate circumferential extents of the final turn, wherein free spaces between the centering surfaces allow for compensation of deviations from an ideal shape of the final turn of the spring.

2. The spring plate of claim 1 wherein said centering surfaces comprise two discrete centering surfaces positioned to contact said inner contour and one curved centering surface positioned to contact said outer contour, wherein the one curved centering surface positioned to contact said outer contour is located circumferentially midway between the two discrete centering surfaces positioned to contact the inner contour, and wherein one of the free spaces is defined between the two discrete centering surfaces.

3. The spring plate of claim 1 wherein only one of said centering surfaces is positioned to contact the outer contour.

4. The spring plate of claim 1 wherein the helical spring contacts the axial surface on a uniformly round contact line, the centering surfaces being arranged parallel to the uniformly round contact line.

5. The spring plate of claim 1 wherein said centering surfaces comprise two discrete centering surfaces positioned to contact said inner contour, the spring plate further comprising an uncurved, slanted surface connecting the two discrete centering surfaces positioned to contact said inner contour.

6. The spring plate of claim 1 wherein the spring plate is formed with an upright tongue which prevents relative rotation between the final turn and the spring plate.

7. The spring plate of claim 6 wherein the end stop is formed adjacent to one of said centering surfaces which is positioned to contact said inner contour, said spring plate being formed with a run-out area between said end stop and said adjacent one of said centering surfaces, said run-out area having an outside radius which is smaller than the inner contour of the helical spring.

8. The spring plate of claim 1 wherein said centering surfaces comprise two discrete centering surfaces positioned to contact said inner contour, the spring plate further comprising a run-off groove located between said two discrete centering surfaces positioned to contact said inner contour.

9. The spring plate of claim 8 wherein said run-off groove extends radially inward from said axial support surface.

10. The spring plate of claim 1 wherein said centering surfaces comprise two discrete centering surfaces positioned to contact said inner contour, and wherein one of the free spaces is defined between the two discrete centering surfaces.

* * * * *